United States Patent
Inglis et al.

(10) Patent No.: US 9,869,162 B2
(45) Date of Patent: Jan. 16, 2018

(54) BALL VALVE HAVING DUAL PISTONS EACH INDIVIDUALLY ACTUABLE

(71) Applicant: HALLIBURTON ENERGY SERVICES, INC., Houston, TX (US)

(72) Inventors: Peter DW Inglis, Dundee (GB); Katherine Ann Davies, Carnoustie (GB)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 542 days.

(21) Appl. No.: 14/397,109

(22) PCT Filed: Dec. 27, 2013

(86) PCT No.: PCT/US2013/078111
§ 371 (c)(1),
(2) Date: Oct. 24, 2014

(87) PCT Pub. No.: WO2015/099787
PCT Pub. Date: Jul. 2, 2015

(65) Prior Publication Data
US 2017/0130559 A1    May 11, 2017

(51) Int. Cl.
*E21B 34/10* (2006.01)
*F16K 5/20* (2006.01)
(Continued)

(52) U.S. Cl.
CPC .............. *E21B 34/10* (2013.01); *E21B 34/14* (2013.01); *F16K 5/201* (2013.01); *F16K 31/1225* (2013.01); *E21B 2034/002* (2013.01)

(58) Field of Classification Search
CPC .. E21B 2034/002; E21B 34/10; E21B 34/101; E21B 34/14; F16K 5/201; F16K 31/1225
See application file for complete search history.

(56) References Cited

U.S. PATENT DOCUMENTS 3,161,204 A    12/1964  Roy, Sr.
3,401,916 A     9/1968  Scaramucci
(Continued)

FOREIGN PATENT DOCUMENTS

EP    0053983 A1    6/1982
EP    0117040 A1    8/1984
(Continued)

OTHER PUBLICATIONS

JFlow Controls, "Dual Seated Metal or Soft Seated Trunnion Ball Valves," http://www.jflowcontrols.com/products/ball-valves/dual-seated-trunnion-ball-valve-9800.aspx; Oct. 2, 2010, 2 pgs.
(Continued)

*Primary Examiner* — Brad Harcourt
(74) *Attorney, Agent, or Firm* — Polsinelli PC

(57) ABSTRACT

Ball valve assembly (100) including a truncated sphere (140) anchored in a two cylindrical retaining members (48, 50) of the ball valve assembly (100), the truncated sphere (140) having a spherical cap sealing face (142). The ball valve assembly (100) also includes a pair of concentrically oriented, tubular sealing pistons (120, 130), each piston (120, 130) exclusively actuable, one relative to the other, into fluid pressured sealing engagement with the spherical cap sealing face (142) in dependence upon whether an experienced fluid pressure at the ball valve assembly (100) is from a top side (102) or an opposite bottom side (104) of the ball valve assembly (100).

20 Claims, 5 Drawing Sheets

(51) Int. Cl.
*F16K 31/122* (2006.01)
*E21B 34/14* (2006.01)
*E21B 34/00* (2006.01)

(56) References Cited

U.S. PATENT DOCUMENTS

| | | | |
|---|---|---|---|
| 3,455,534 | A | 7/1969 | Scaramucci |
| 4,576,234 | A | 3/1986 | Upchurch |
| 4,673,164 | A | 6/1987 | Nakanishi et al. |
| 4,725,042 | A | 2/1988 | Mason |
| 4,899,980 | A | 2/1990 | Kemp |
| 4,953,587 | A | 9/1990 | Steele |
| 5,259,590 | A | 11/1993 | Chambers |
| 5,263,685 | A | 11/1993 | Winnike et al. |
| 5,322,261 | A | 6/1994 | Aarnes |
| 5,338,003 | A | 8/1994 | Beson |
| 6,981,691 | B2 | 1/2006 | Caprera |
| 7,635,113 | B2 | 12/2009 | Bearer et al. |
| 7,758,016 | B2 | 7/2010 | Scott et al. |
| 8,398,053 | B2 | 3/2013 | Ezekiel |
| 8,424,841 | B2 | 4/2013 | Frenzel |
| 8,534,360 | B2 | 9/2013 | Kalb et al. |
| 2007/0278438 | A1* | 12/2007 | Scott ............... F16K 5/205 251/172 |
| 2012/0145938 | A1 | 6/2012 | Avdjian |
| 2012/0168660 | A1 | 7/2012 | Balan et al. |
| 2012/0298901 | A1 | 11/2012 | Ringgenberg |

FOREIGN PATENT DOCUMENTS

| | | |
|---|---|---|
| EP | 0433207 A2 | 6/1991 |
| EP | 1643173 A2 | 4/2006 |

OTHER PUBLICATIONS

Top Entry Valves, http://www.apollovalves.com/_products/flg/Top_Entry_Special_Applications.pdf, Oct. 16, 2013, 1 pg.
International Search Report and Written Opinion dated Sep. 1, 2014. In corresponding application No. PCT/US2013/078111.

\* cited by examiner

BALL VALVE HAVING DUAL PISTONS EACH INDIVIDUALLY ACTUABLE

CROSS-REFERENCE TO RELATED APPLICATIONS

This application is a national stage entry of PCT/US2013/078111 filed Dec. 27, 2013, said application is expressly incorporated herein in its entirety.

FIELD

The subject matter herein generally relates to ball valves and particular seals of ball valves and actuation of the seals.

BACKGROUND

A ball valve can be configured to have a seal that allows for sealing of flow around the ball. The seal can be configured to be a passive seal that presses against the ball at all times.

BRIEF DESCRIPTION OF THE DRAWINGS

Implementations of the present technology will now be described, by way of example only, with reference to the attached figures, wherein.

DETAILED DESCRIPTION

Figure 1:
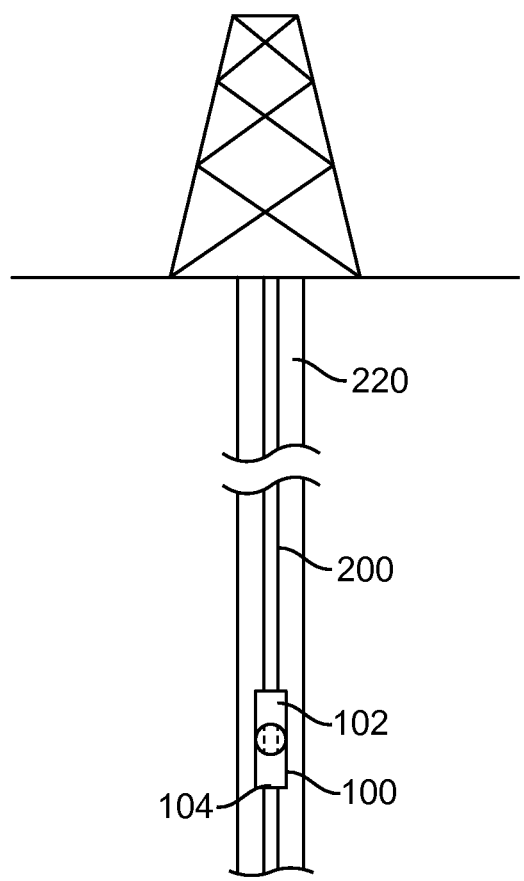
FIG. 1 is an example of a subterranean well, pipe string and a ball valve assembly, according to the present technology.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, even if the object is not exactly circular or cylindrical. The term "axially" means substantially along a direction of the axis of the object. If not specified, the term axially is such that it refers to the longer axis of the object. The term "ball" as used herein with respect to a ball valve assembly, is the portion of the ball valve assembly that substantially resembles a ball or a spherical member. The ball can have one or more truncated regions such that the ball is not truly spherical. The remainder of the description refers to a truncated sphere, but other types of balls can be implemented herein.

The present disclosure is described in relation to a ball valve assembly. The present technology can be used in other implementations wherein a dual acting seal is desired. The present technology provides a pair of sealing pistons, each configured to be exclusively actuable, relative to the other, into fluid pressured sealing engagement with sealing face of another member, for example a spherical sealing face of a truncated sphere. In at least one embodiment, the fluid pressured sealing engagement can be in dependence upon whether an experienced fluid pressure is from a top side or an opposite bottom side of an assembly, for example a ball valve assembly.

In at least one embodiment, the present technology is implemented as a ball valve assembly 100 that is configured to be implemented in a downhole environment, such as the one illustrated in FIG. 1. As illustrated in FIG. 1, the ball valve assembly 100 includes a top side 102 and a bottom side 104. The top side 102 and the bottom side are configured such that the bottom side 104 is closer to the bottom of the hole when installed in a downhole pipe string 200. As mentioned above, the ball valve assembly can be implemented in other non-downhole environments. As shown, the ball valve assembly 100 is within the borehole 220 formed during a drilling operation. As illustrated, the ball valve assembly 100 can have a larger outside diameter than the pipe string 200. In other embodiments, the ball valve assembly 100 can have the same outside diameter as the pipe string 200.

Figure 2:
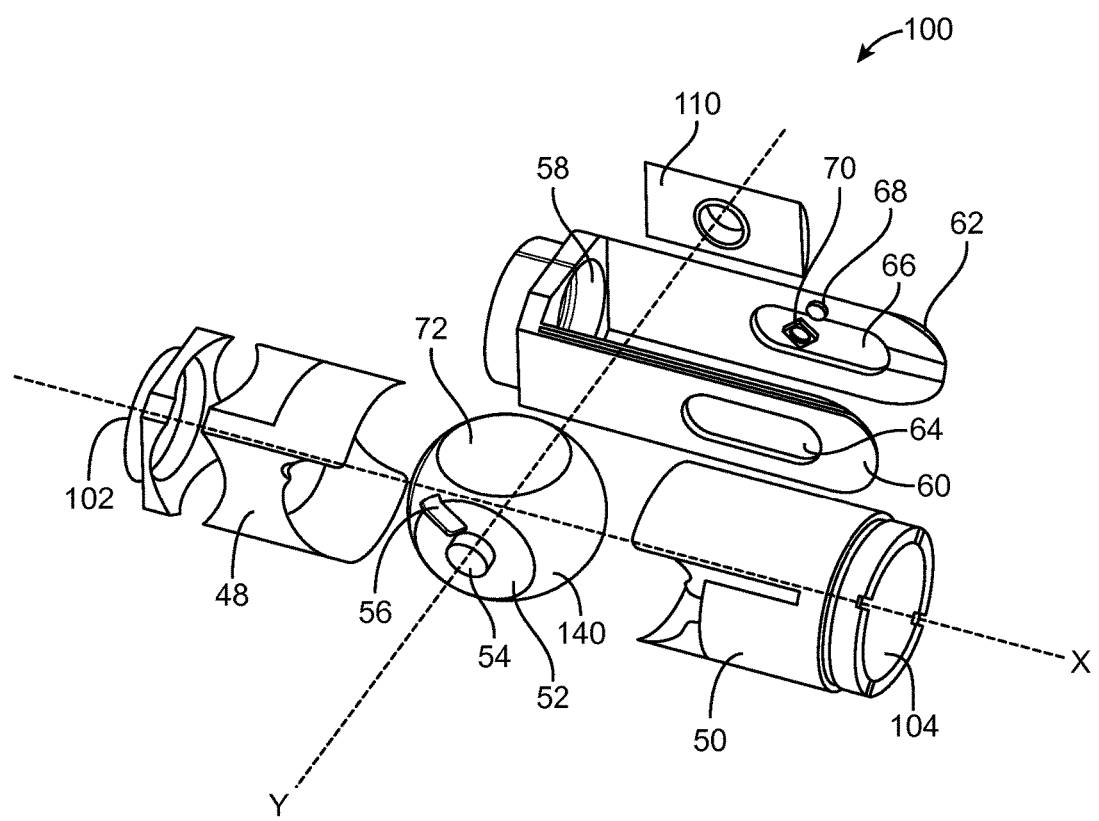
FIG. 2 is an example of an assembly view of a ball valve assembly constructed according to the present technology.

FIG. 2 is an example of an assembly view of a ball valve assembly 100 constructed according to the present technology. FIG. 2 illustrates the components of an embodiment of the mechanism used to move the truncated sphere between an open and closed position. The mechanism comprises two cylindrical retaining members (48, 50) each on opposite sides of the truncated sphere 140. Each member of the two cylindrical retaining members (48, 50) can be a cylindrical retaining member. One 48 of the two cylindrical retaining members (48, 50) can be located on the top side 102 of the ball valve assembly 100. The other 50 two cylindrical retaining members (48, 50) can be located on the bottom side 104 of the ball valve assembly 100. The truncated sphere 140 can be a truncated sphere having planar surfaces 52 on opposite sides of the sphere. Only one of the planar surfaces 52 is visible in the FIG. 2. In at least one other embodiment, the truncated sphere 140 can have additional planar surfaces. Additionally, in at least one embodiment, the truncated sphere 140 can have just one planar surface 52 or even no planar surface. At least one of the planar surfaces 52 can have a cylindrical projection 54 extending outwardly therefrom, and a radial groove 56 from the projection 54. In an embodiment, where two planar surfaces 52 are provided on the truncated sphere 140, the other planar surface (not shown) can have a cylindrical projection 54 extending outwardly therefrom, and a radial groove 56 from the projection 54. When two opposite planar surfaces 52 include a cylindrical projection 54 extending outwardly therefrom, and a radial groove 56 from the projection 54, the truncated sphere 140 can be more easily held in place.

Additionally, the ball valve assembly 100 can include an actuation member 58 having two arms (60, 62) positioned over the top of both the truncated sphere 140 and the two cylindrical retaining members (48, 50). The actuation member 58 can be aligned such that arms (60, 62) are in a plane substantially parallel to that of two planar surfaces 52. Projections 54 can be received in windows (64, 66) through each of the arms (60, 62).

Actuation pins 68 can be provided on each of the inner sides of the arms (60, 62). The actuation pins 68 can be received within the grooves 56 on the truncated sphere 140. Additionally, bearings 70 can be positioned between each pin 68 and groove 56.

In the closed position, as illustrated, the radial groove 56 is positioned so as to prevent flow of fluid through a fluid passageway 72 extending through the truncated sphere 140. During operation, the truncated sphere 140 is rotated about rotational axis Y such that the passageway 72 is rotated into or out of alignment with the flow of fluid, in order to open or close the ball valve assembly 100. The truncated sphere 140 can be rotated by linear movement of the actuation member 58 along plane X. The pins 68 can move as the actuation member 58 moves, which causes the truncated sphere 140 to rotate due to the positioning of the pins 68 within the grooves 56 on the truncated sphere 140.

FIG. 2 also illustrates a trunnion 110. The trunnion 110 can be included in ball valve assemblies 100 that are subject to high pressures, such as a downhole well environment. The trunnion 110 operates to provide an anchoring of the truncated sphere 140. The trunnion can be configured to receive the cylindrical projection 54 of the truncated sphere. In at least one embodiment, a bearing ring can be fitted over the cylindrical projection and locate within the receiving portion of the trunnion 110. The trunnion 110 can be included when the ball valve assembly 100 is configured to operate in high pressure environments such as a downhole environment. The trunnion operates to provide an anchoring of the truncated sphere 140. Additionally, the trunnion can locate and support the truncated sphere. The trunnion can provide an axis for the truncated sphere to rotate about. In other embodiments, the trunnion 110 can be omitted.

Figure 3:
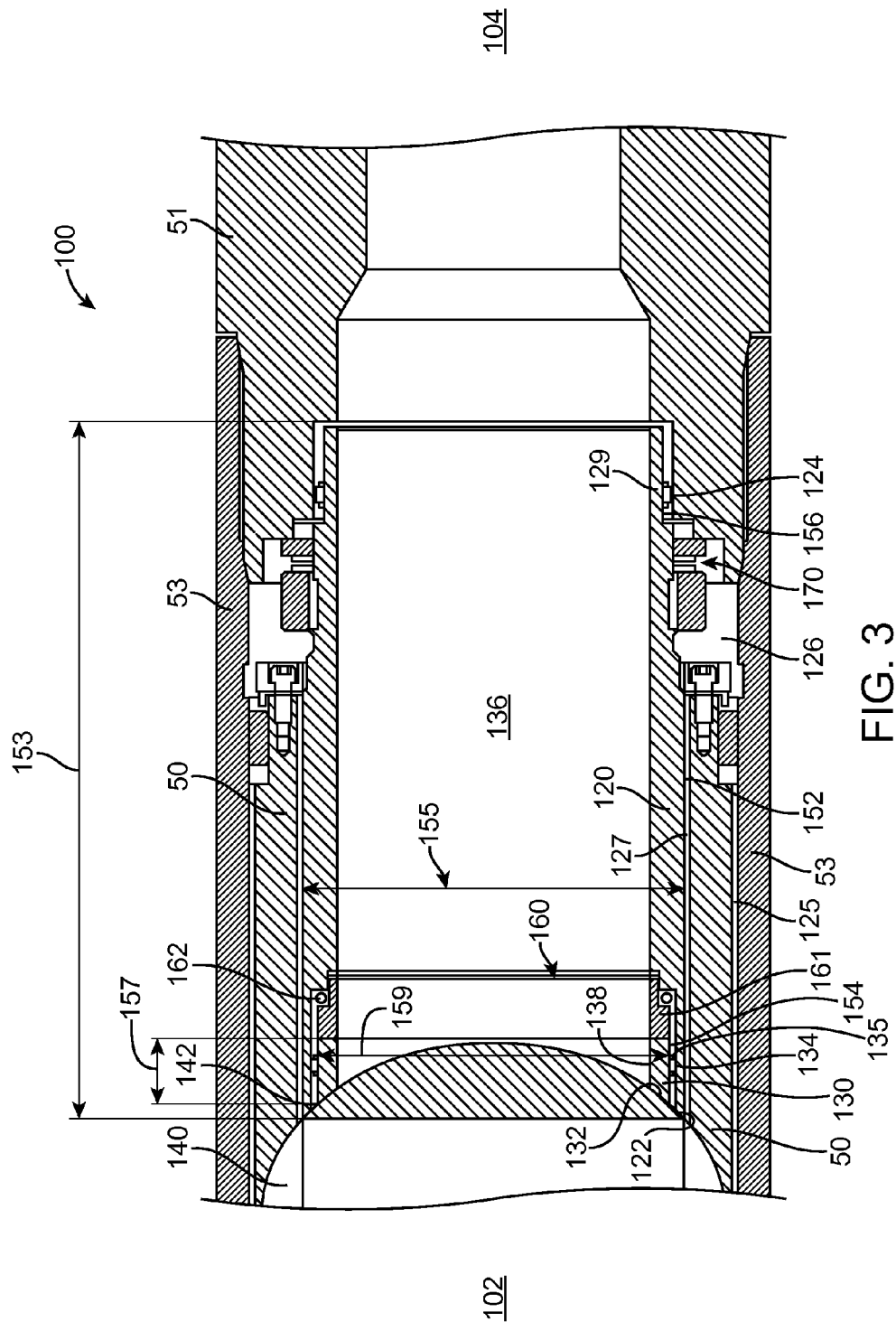
FIG. 3 is an example cross-sectional view of a ball valve assembly having two seals according to the present technology.
Figure 4:
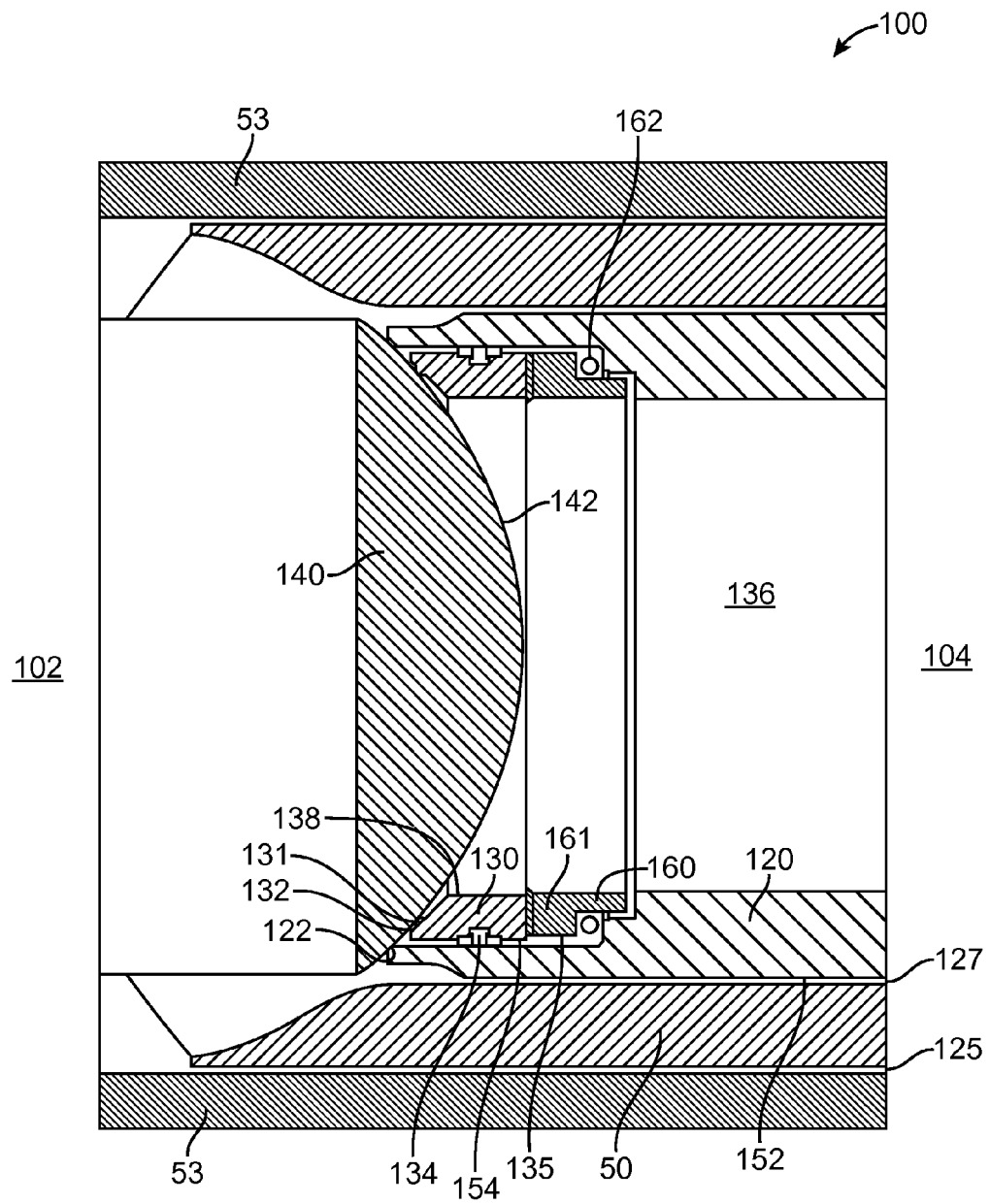
FIG. 4 is a close up view of a portion of FIG. 3.

FIG. 3 is an example cross-sectional view of a ball valve assembly having two seals according to the present technology. FIG. 4 is a close up view of FIG. 3, so as to better illustrate the interaction between the two seals and the truncated sphere 140. As illustrated, the present technology includes a ball valve assembly 100. The ball valve assembly 100 can be included in a pipe string 200 of a subterranean well 300, such as the one illustrated in FIG. 1. The ball valve assembly 100 can comprise a truncated sphere 140 anchored in a two cylindrical retaining members (48, 50) of the ball valve assembly 100. The truncated sphere 140 can have a spherical cap sealing face 142.

Additionally, the ball valve assembly 100 can include a pair of concentrically oriented, tubular sealing pistons (120, 130). Each piston (120, 130) can be exclusively actuable, one relative to the other, into fluid pressured sealing engagement with the spherical cap sealing face 142 in dependence upon whether an experienced fluid pressure at the ball valve assembly 100 is from a top side 102 or an opposite bottom side 104 of the ball valve assembly 100.

In at least one example, each of the pair of concentrically oriented, tubular sealing pistons (120, 130) can be substantially cylindrical shaped. One 130 of the pair of concentrically oriented, cylindrical sealing pistons (120, 130) can be at least partially contained within an interior of the other 120 of the pair (120, 130). In another embodiment, the configuration of the concentrically oriented, cylindrical sealing pistons (120, 130) can be reversed such that one 120 of the pair of concentrically oriented, cylindrical sealing pistons (120, 130) is at least partially contained within an interior of the other 130 of the pair (120, 130). The following description is based on the configuration of one 130 of the pair of concentrically oriented, cylindrical sealing pistons (120, 130) can be at least partially contained within an interior of the other 120 of the pair (120, 130), but the disclosure equally applies to the other configuration.

The ball valve assembly 100 can comprise a top-side fluid pressure chamber 126 exclusively exposed to pressure applied from the top side 102 of the ball valve assembly 100. The top-side fluid pressure chamber 126 can be at least partially bounded by a top-pressure responsive piston 120 that is one of the pair of concentrically oriented, tubular sealing pistons (120, 130). The top-pressure responsive piston 120 can be driven toward the spherical cap sealing face 142 of the truncated sphere 140 when fluid pressure from the top side 102 of the ball valve assembly 100 is experienced within the top-side fluid pressure chamber 126. The top-pressure responsive piston 120 can at least partially exteriorly surround the other 130 of the pair of concentrically oriented, tubular sealing pistons (120, 130). The cylindrical shaped, top-pressure responsive piston 120 can have a length 153 and diameter 155, each greater than a respective length 157 and diameter 159 of the other 130 of the pair of concentrically oriented, tubular sealing pistons (120, 130). The top-pressure responsive piston 120 can contain the other 130 of the pair of concentrically oriented, tubular sealing pistons (120, 130) within an interior thereof.

The ball valve assembly 100 can further comprise a bottom boundary 156 of the top-side fluid pressure chamber 126 and can be an annular seal 124 about a bottom end 129 of the cylindrical shaped, top-pressure responsive piston 120. As shown, a majority of an exterior surface 152 of the top-pressure responsive piston 120 is exposed to the top-side fluid pressure chamber 126 and in turn fluid pressure from the top side 102 of the ball valve assembly 100. The annular seal 124 about the bottom end 129 of the cylindrical shaped, top-pressure responsive piston 120 forms a seal between the piston 120 and the housing 51 of the ball valve assembly 100. This facilitates translation of the piston 120 between a down-shifted, non-sealing configuration and an up-shifted sealing configuration in which a sealing surface 122 of the piston 120 sealingly-engages the spherical cap sealing face 142 of the truncated sphere 140. In at least one embodiment, the annular seal 124 can be a T-seal so as to allow translation of the top-pressure responsive piston 120 relative to the housing 51 at the bottom side 104 of the ball valve assembly 100. In other embodiments, the annular seal 124 can be another type of seal that allows for the top-pressure responsive piston 120 to translate relative to the housing 51 and maintain a seal that effectively seals the top-side fluid pressure chamber 126.

Additionally, the ball valve assembly 100 can include fluid passageways (125, 127) to allow fluid communication between the top-side fluid pressure chamber 126 and the top side 102 of the ball valve assembly. An outer fluid passageway 125 can be formed between the one 50 of the two cylindrical retaining members (48, 50) and outer body 53. An inner fluid passageway 127 can be formed between the top-pressure responsive piston 120 and the one 50 of the two cylindrical retaining members (48, 50). These passageways (125, 127) are located such that the passageways (125, 127) are located so as to be in fluid communication with a top side 102 of the ball valve assembly. As illustrated, the passageways (125, 127) are located such that they are radially outward from the sealing surface 122 of the top-pressure responsive piston 120. In this configuration, the passageways (125, 127) provide for fluid to communicate with the top-side fluid pressure chamber 126 and thereby allow sealing surface 122 to contact the spherical cap sealing face 142.

The ball valve assembly 100 can further comprise a biasing member 170 that urges a sealing surface 122 of the cylindrical shaped, top-pressure responsive piston 120 into contact with the spherical cap sealing face 142 of the truncated sphere 140 in the absence of fluid pressure from the top side 102 of the ball valve assembly 100.

The ball valve assembly 100 can further comprise a bottom-side fluid pressure chamber 136 exclusively exposed to pressure applied from the bottom side 104 of the ball valve assembly 100. The bottom-side fluid pressure chamber 136 can be at least partially bounded by a bottom-pressure responsive piston 130 that is one of the pair of concentrically oriented, tubular sealing pistons (120, 130). The bottom-pressure responsive piston 130 can be driven toward the spherical cap sealing face 142 of the truncated sphere 140 when fluid pressure from the bottom side 104 of the ball valve assembly 100 is experienced within the bottom-side fluid pressure chamber 136. The bottom-pressure responsive piston 130 can be at least partially surrounded by the other 120 of the pair of concentrically oriented, tubular sealing pistons (120, 130). The other 120 can be a top-pressure responsive piston 120. The cylindrical shaped, bottom-pressure responsive piston 130 can have a length 157 and diameter 159, each less than a respective length 155 and diameter 157 of the top-pressure responsive piston 120. The bottom-pressure responsive piston 130 can be contained in the top-pressure responsive piston 120.

The ball valve assembly 100 can further comprise a boundary 135 of the bottom-side fluid pressure chamber 136 in the form of an annular seal 134 about the cylindrical shaped, bottom-pressure responsive piston 130, and configured such that a majority of an exterior surface 154 of the piston 130 is exposed to the bottom-side fluid pressure chamber 136 and in turn fluid pressure from the bottom side 104 of the ball valve assembly 100. The annular seal 134 about the cylindrical shaped, bottom-pressure responsive piston 130 forms a seal between the pair of pistons (120, 130) thereby facilitating translation of the bottom-pressure responsive piston 130 relative to the top-pressure responsive piston 120.

The ball valve assembly 100 can further comprise a biasing member 160 that urges a sealing surface 132 of the cylindrical shaped, bottom-pressure responsive piston 130 into contact with the spherical cap sealing face 142 of the truncated sphere 140 in the absence of fluid pressure from the bottom side 104 of the ball valve assembly 100. The ball valve assembly 100 can further comprise a biased take-up mechanism interstitially positioned between the top-pressure responsive piston 120 and bottom-pressure responsive piston 130. This permits relative translational movement between the pistons (120, 130) while maintaining contact between a sealing surface 132 of the bottom-pressure responsive piston 130 and the spherical cap sealing face 142 of the truncated sphere 140. The biased take-up mechanism can also function in the absence of fluid pressure from the bottom side 104 of the ball valve assembly 100 and in the presence of fluid pressure from the top side 102 of the ball valve assembly 100 acting on the top-pressure responsive piston 120. Additionally, the bottom-pressure responsive piston 130 can have an interior face 138 that is exposed to the bottom side pressure chamber 136.

The biasing member 160 can include one or more components. For example, as illustrated the biasing member includes a contact member 161 and a spring 162. The spring 162 can be replaced by a hydraulic member in at least one embodiment that provides the biasing force. The biasing force can be configured to cause the contact member 161 to contact the bottom-pressure responsive piston 130. Thereby, the bottom-pressure responsive piston can be urged towards the truncated sphere 140 even when little or no pressure is present in the bottom side pressure chamber 136. This allows the bottom-pressure responsive piston to cause the sealing surface 132 to effectively seal the fluid in the bottom side 104 relative to the top side 102 of the ball valve assembly 100. While a spring 162 and hydraulic member have been described above, the present disclosure contemplates that other biasing components could be used in place of the spring 162.

As mentioned above, FIG. 4 provides a closer view of the truncate sphere 140, sealing surface 122 of the top-pressure responsive piston 120, sealing surface 132 of the bottom-pressure responsive piston 130, and the biasing member 160. As illustrated, the sealing surface 132 of the bottom-pressure responsive piston 130 can include a seal 131. The seal 131 can be shaped such that it substantially conforms to the spherical cap sealing face 142. The seal 131 can be made of a material that retains its shape and is subject to little or no deformation at normal operating pressures. In at least one example, the material can be a metal. In other embodiments, the seal 131 can be a rubber, plastic, or other material that can be deformed at normal operating pressures. Additionally, in one or more embodiments, the seal 131 can be a coating that is applied. The coating can be a metallic coating, such chrome plating. Likewise, the sealing surface 122 of the top-pressure responsive piston 120 can be made of a material, for example a metal, that is subject to little or no deformation under normal operating pressures. In yet other embodiments, the sealing surface 122 can be made of a deformable material, for example, a rubber or a plastic, that can be deformed at normal operating pressures. Additionally, in one or more embodiments, the sealing surface 122 can be a coating that is applied. The coating can be a metallic coating, such chrome plating. Similarly, the sealing surface 132 of the bottom-pressure responsive piston 130 can be made of a material, for example a metal, that is subject to little or no deformation under normal operating pressures. In yet other embodiments, the sealing surface 132 can be made of a deformable material, for example, a rubber or a plastic, that can be deformed at normal operating pressures. Additionally, in one or more embodiments, the sealing surface 132 can be a coating that is applied. The coating can be a metallic coating, such chrome plating.

Furthermore, a boundary 135 of the bottom-side fluid pressure chamber 136 can include an annular seal 134 about the cylindrical shaped, bottom-pressure responsive piston 130. Further, a majority of an exterior surface 154 of the piston 130 is exposed to the bottom-side fluid pressure chamber 136 and in turn fluid pressure from the bottom side 104 of the ball valve assembly 100. The annular seal 134 as illustrated can be a T-seal. Other types of seals can be used for the annular seal 134 that allow for sealing of the pressure chamber 136 and also allow translation of the bottom-pressure responsive piston 130 relative to the top-pressure responsive piston 120.

Furthermore, a more detailed view of the biasing member 160 is illustrated. The biasing member 160 includes a contact member 161 that has a top side that is configured to contact a bottom side of the bottom-pressure responsive piston 130 and thereby bias the bottom-side responsive piston 130 towards the spherical cap sealing face 142. As illustrated, the contact member 161 is a separate component from the bottom-pressure responsive piston 130, but in another embodiment, the bottom-pressure responsive piston 130 and contact member can be formed as one component, bonded together, releasably coupled together, or fixedly attached to one another. The biasing member 160 can include a spring 162. The spring 162 supplies the force to cause the biasing member 160 to contact the bottom-pressure responsive piston 130.

Figure 5:
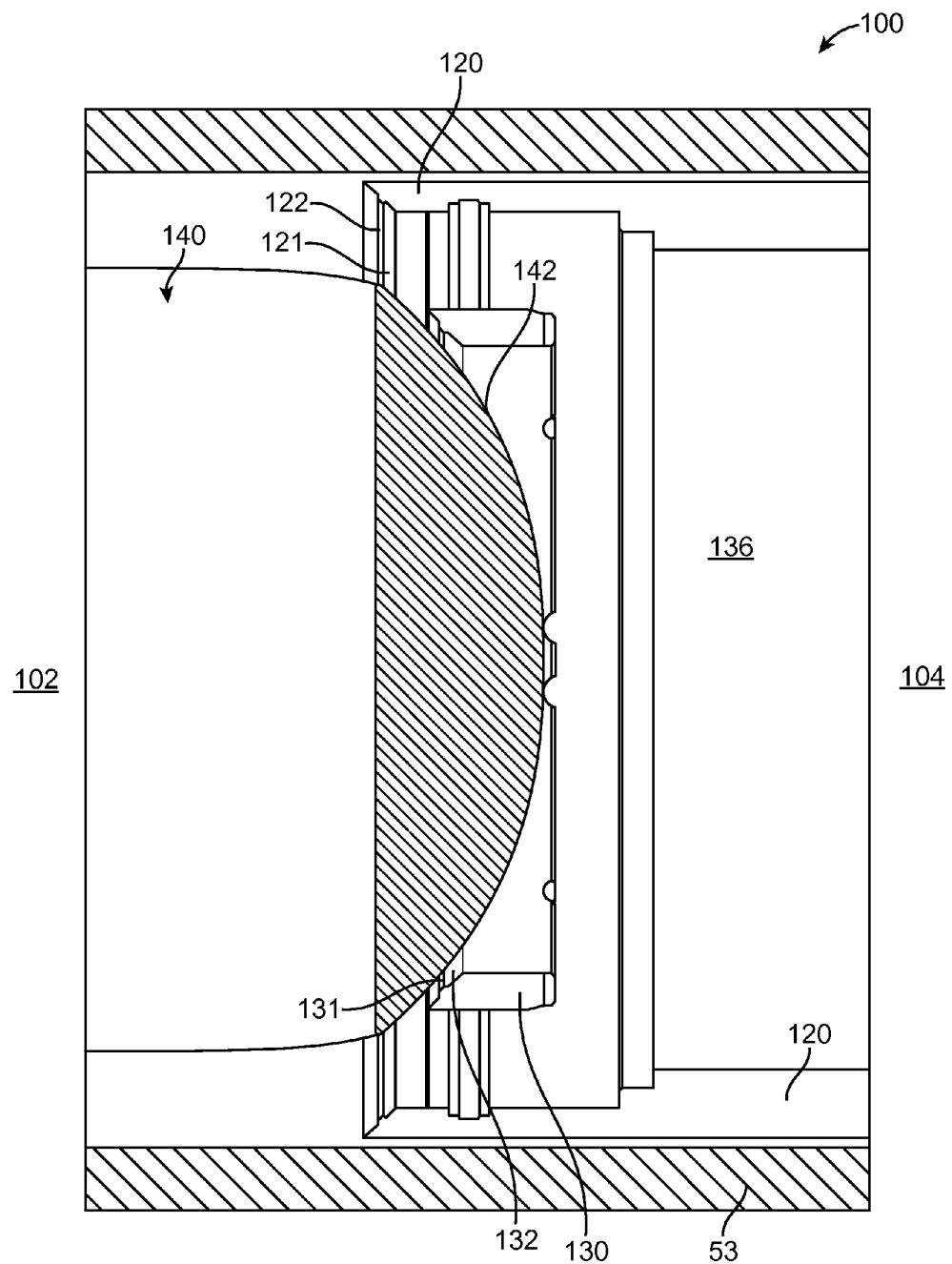
FIG. 5 is an example of a different cross-sectional view of a ball valve assembly according to the present technology.

FIG. 5 is an example of a different cross-sectional view of the ball valve assembly 100 according to the present technology. As illustrated, the ball valve assembly includes a truncated sphere 140 which has a spherical cap sealing face 142. Additionally, the ball valve assembly 100 includes a pair of concentrically oriented, tubular sealing pistons (120, 130), each piston (120, 130) can be exclusively actuable, one relative to the other, into fluid pressured sealing engagement with the spherical cap sealing face 142 in dependence upon whether an experienced fluid pressure at the ball valve assembly 100 is from a top side 102 or an opposite bottom side 104 of the ball valve assembly 100.

For example, one 130 of the pair of pistons (120, 130) can be contained within the other 120 as described above. Additionally, the one 130 contained within the other 120 can be partially or fully contained. Furthermore, in at least one implementation, the one 120 can be a top-pressure responsive piston 120. The top-pressure responsive piston 120 can be driven toward the spherical cap sealing face 142 of the truncated sphere when fluid pressure from the top side 102 of the ball valve assembly 100 is experienced within a top-side fluid pressure chamber as described above. The top-pressure responsive piston 120 can include a sealing surface that is configured to sealing-engage the spherical cap sealing face 142 of the truncated sphere 140. The sealing surface 122 can include a raised ridge or seal 121 that can be substantially shaped to conform to a corresponding portion of the spherical cap sealing face 142. The seal 121 can be shaped in dependence upon the curvature of the spherical cap sealing face 142.

Additionally, the other 130 can be a bottom-pressure responsive piston 130 that is configured to contact with the spherical cap sealing face 142 of the truncated sphere 140 when fluid pressure from the bottom side 104 of the ball valve assembly 100 is experienced within the bottom-side fluid pressure chamber 136. The bottom-pressure responsive piston 130 can include sealing surface 132. The sealing surface can include a raised ridge or seal 131. The seal 131 can be substantially shaped to conform to a corresponding portion of the spherical cap sealing face 142. The seal 131 can be shaped in dependence upon the curvature of the spherical cap sealing face 142.

The embodiments shown and described above are only examples. Many details are often found in the art such as the other features of a ball valve assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A ball valve assembly for inclusion in a pipe string of a subterranean well, the ball valve assembly comprising:
   a truncated sphere anchored in two cylindrical retaining members of the ball valve assembly, the truncated sphere having a spherical cap sealing face; and
   a pair of concentrically oriented, tubular sealing pistons, each piston exclusively actuable, one relative to the other, into fluid pressured sealing engagement with the spherical cap sealing face in dependence upon whether an experienced fluid pressure at the ball valve assembly is from a top side or an opposite bottom side of the ball valve assembly
   wherein the experienced fluid pressure engages only one of the pair of concentrically oriented, tubular sealing pistons into fluid pressure sealing engagement with the spherical sealing cap face.

2. The ball valve assembly of claim 1, wherein each of the pair of concentrically oriented, tubular sealing pistons are cylindrical shaped.

3. The ball valve assembly of claim 2, wherein one of the pair of concentrically oriented, cylindrical sealing pistons is at least partially contained within an interior of the other of the pair.

4. The ball valve assembly of claim 2, further comprising a top-side fluid pressure chamber exclusively exposed to pressure applied from the top side of the ball valve assembly.

5. The ball valve assembly of claim 4, wherein the top-side fluid pressure chamber is at least partially bounded by a top-pressure responsive piston that is one of the pair of concentrically oriented, tubular sealing pistons, the top-pressure responsive piston being driven toward the spherical cap sealing face of the truncated sphere when fluid pressure from the top side of the ball valve assembly is experienced within the top-side fluid pressure chamber.

6. The ball valve assembly of claim 5, wherein the top-pressure responsive piston at least partially exteriorly surrounds the other of the pair of concentrically oriented, tubular sealing pistons.

7. The ball valve assembly of claim 6, wherein the cylindrical shaped, top-pressure responsive piston has a length and diameter, each greater than a respective length and diameter of the other of the pair of concentrically oriented, tubular sealing pistons.

8. The ball valve assembly of claim 7, wherein the top-pressure responsive piston contains the other of the pair of concentrically oriented, tubular sealing pistons within an interior thereof.

9. The ball valve assembly of claim 5, further comprising a bottom boundary of the top-side fluid pressure chamber being an annular seal about a bottom end of the cylindrical shaped, top-pressure responsive piston and such that a majority of an exterior surface of the piston is exposed to the top-side fluid pressure chamber and in turn fluid pressure from the top side of the ball valve assembly.

10. The ball valve assembly of claim 9, wherein the annular seal about the bottom end of the cylindrical shaped, top-pressure responsive piston forms a seal between the piston and the one member of the two cylindrical retaining members of the ball valve assembly thereby facilitating translation of the piston between a down-shifted, non-sealing configuration and an up-shifted sealing configuration in which a sealing surface of the piston sealingly-engages the spherical cap sealing face of the truncated sphere.

11. The ball valve assembly of claim 5, further comprising a biasing member that urges a sealing surface of the cylindrical shaped, top-pressure responsive piston into contact with the spherical cap sealing face of the truncated sphere in the absence of fluid pressure from the top side of the ball valve assembly.

12. The ball valve assembly of claim 2, further comprising a bottom-side fluid pressure chamber exclusively exposed to pressure applied from the bottom side of the ball valve assembly.

13. The ball valve assembly of claim 12, wherein the bottom-side fluid pressure chamber is at least partially bounded by a bottom-pressure responsive piston that is one of the pair of concentrically oriented, tubular sealing pistons, the bottom-pressure responsive piston being driven toward the spherical cap sealing face of the truncated sphere when fluid pressure from the bottom side of the ball valve assembly is experienced within the bottom-side fluid pressure chamber.

14. The ball valve assembly of claim 13, wherein the bottom-pressure responsive piston is at least partially surrounded by the other of the pair of concentrically oriented, tubular sealing pistons, and which is a top-pressure responsive piston.

15. The ball valve assembly of claim 14, wherein the cylindrical shaped, bottom-pressure responsive piston has a length and diameter, each less than a respective length and diameter of the top-pressure responsive piston.

16. The ball valve assembly of claim 15, wherein the bottom-pressure responsive piston is contained in the top-pressure responsive piston.

17. The ball valve assembly of claim 13, further comprising a boundary of the bottom-side fluid pressure chamber being an annular seal about the cylindrical shaped, bottom-pressure responsive piston and such that a majority of an exterior surface of the piston is exposed to the bottom-side fluid pressure chamber and in turn fluid pressure from the bottom side of the ball valve assembly.

18. The ball valve assembly of claim 17, wherein the annular seal about the cylindrical shaped, bottom-pressure responsive piston forms a seal between the pair of pistons thereby facilitating translation of the bottom-pressure responsive piston relative to the top-pressure responsive piston.

19. The ball valve assembly of claim 18, further comprising a biasing member that urges a sealing surface of the cylindrical shaped, bottom-pressure responsive piston into contact with the spherical cap sealing face of the truncated sphere in the absence of fluid pressure from the bottom side of the ball valve assembly.

20. The ball valve assembly of claim 18, further comprising a biased take-up mechanism interstitially positioned between the top-pressure responsive piston and bottom-pressure responsive piston thereby permitting relative translational movement between the pistons while maintaining contact between a sealing surface of the bottom-pressure responsive piston and the spherical cap sealing face of the truncated sphere in the absence of fluid pressure from the bottom side of the ball valve assembly and in the presence of fluid pressure from the top side of the ball valve assembly acting on the top-pressure responsive piston.

\* \* \* \* \*